No. 665,991. Patented Jan. 15, 1901.
I. S. BROWN.
INSTRUMENT FOR TEACHING TOUCH TYPE WRITING.
(Application filed Oct. 5, 1900.)
(No Model.) 2 Sheets—Sheet 1.
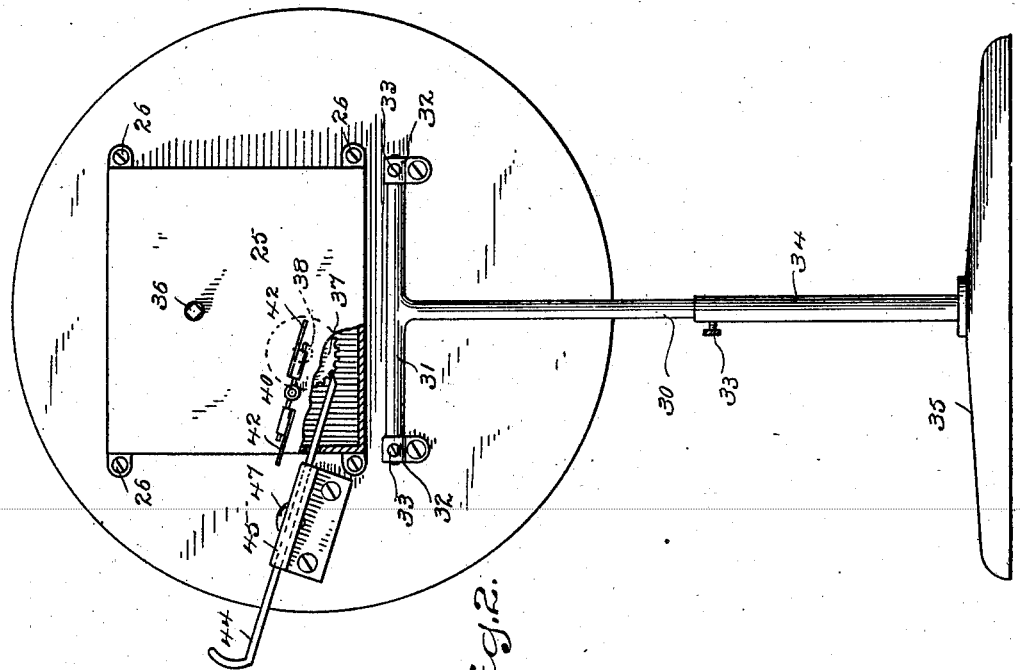
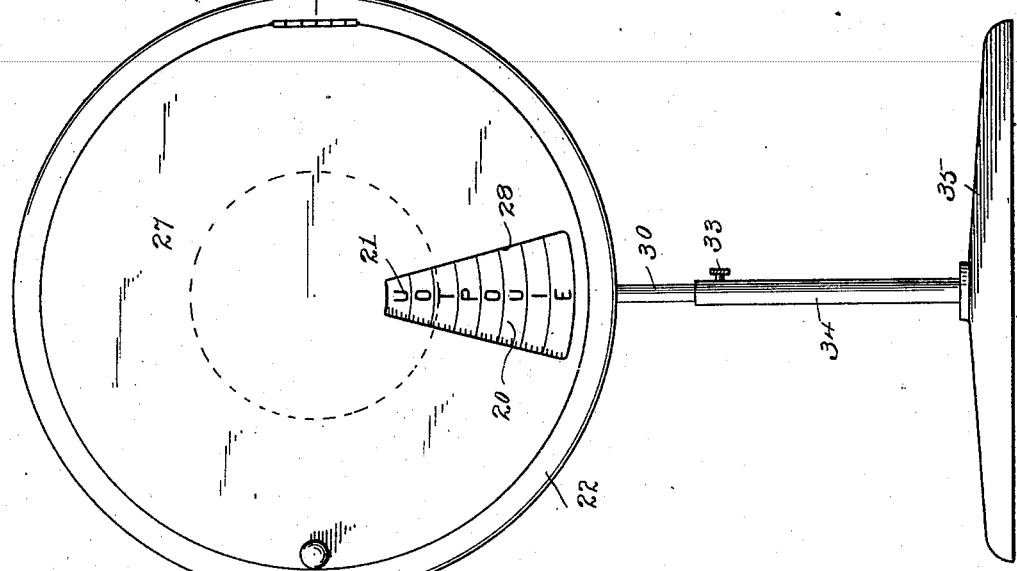
WITNESSES. INVENTOR.
H. A. Lamb Ira S. Brown
S. W. Atherton. By A. M. Wooster
Atty.

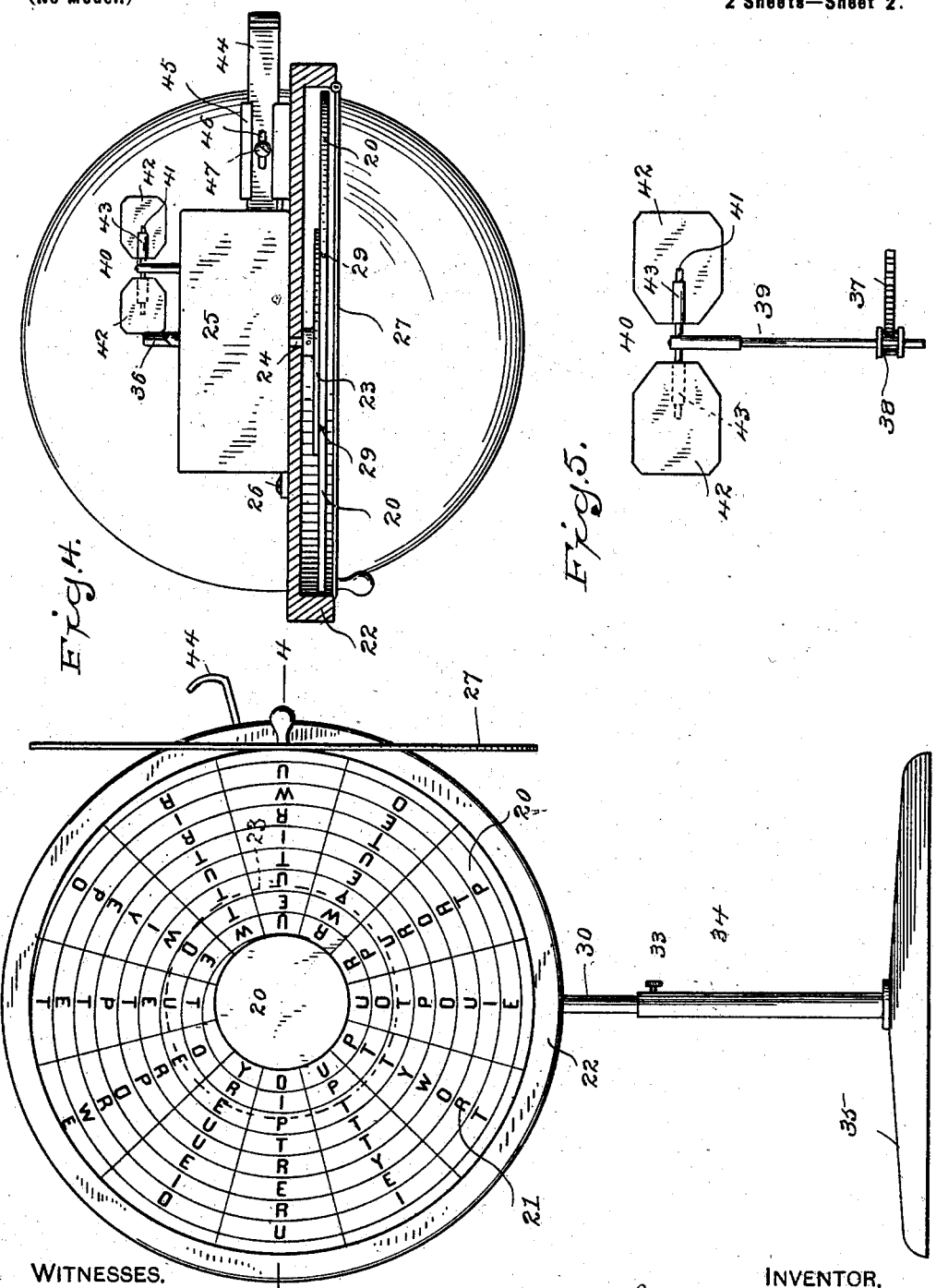

UNITED STATES PATENT OFFICE.

IRA S. BROWN, OF SOUTH NORWALK, CONNECTICUT.

INSTRUMENT FOR TEACHING TOUCH TYPE-WRITING.

SPECIFICATION forming part of Letters Patent No. 665,991, dated January 15, 1901.

Application filed October 5, 1900. Serial No. 32,145. (No model.)

*To all whom it may concern:*

Be it known that I, IRA S. BROWN, a citizen of the United States, residing at South Norwalk, county of Fairfield, State of Connecticut, have invented a new and useful Instrument for Teaching Touch Type-Writing, of which the following is a specification.

My invention has for its object to provide a simple and inexpensive instrument for teaching touchwork—such, for instance, as typewriting or manipulation of the keyboard of a musical instrument which shall have both vertical and oscillatory adjustment, so as to adapt it for use by different persons and in different positions, which may be conveniently stopped and started, and which may be so regulated as to cause the lesson-disk to rotate at any desired rate of speed.

With these ends in view I have devised the simple and novel touch-teaching instrument which I will now describe, referring to the accompanying drawings, forming part of this specification, and using reference characters to designate the several parts.

Figure 1 is a front elevation of my novel instrument as in use; Fig. 2, a corresponding rear elevation, a portion of the movement-case being broken away; Fig. 3, a view corresponding with Fig. 1, the door of the disk-case being open to show the manner in which the lesson-disks are removed and replaced; Fig. 4, a horizontal section of the disk-case on the line 4 4, the movement-case appearing in plan; and Fig. 5 is an enlarged detail plan view of the regulating-fan detached.

For convenience in illustration and description I have shown one use only of my novel instrument—to wit, that of teaching touch type-writing—and shall confine my description to that use, it being of course obvious that words instead of single characters may be placed upon the disks, or that if used to teach the keyboard of a musical instrument the characters of musical notation would be substituted for words or letters.

My novel instrument comprises, essentially, changeable lesson-disks, a case therefor capable of adjustment in any required position, means for rotating the disk, and means for conveniently regulating its speed.

20 denotes disks which I term "lesson-disks," and which may be made reversible, so as to have a lesson on each side. These disks may be made of paper or any suitable material. Paper disks, however, meet the requirements perfectly and cost but a trifle.

21 denotes characters or words upon the disks, which are arranged spirally, commencing near the center and running out at the edge of the disk. The surfaces of the disks may be divided by radial lines and a spiral line into sections to receive the characters, although this is unimportant.

22 denotes a case for the lesson-disks, within which is a rotary carrying-disk 23, which I have shown as fixed to the main shaft 24 of a spring-motor which as a whole, including its case, I have indicated by 25, illustration and detailed description of the motor being omitted for the reason that the special construction thereof is unimportant, so far as the principle of my invention is concerned. I have simply shown the case of the motor as attached to the back of the disk-case by screws 26. The front of the disk-case is shown as closed by a door 27, provided with a slot 28, through which the characters upon the lesson-disk appear successively, as is clearly shown in Fig. 1. In changing lessons the teacher is simply required to open the door and reverse the disk 20 or place a new one upon the carrying-disk, which is shown as provided with pins 29, adapted to penetrate the lesson-disks to hold them in place. In order to secure by oscillation any desired angle of inclination of the disk-case that will be most convenient for the operator, I hinge the disk-case in any suitable manner to a vertical rod 30. In the present instance I have shown the vertical rod as carrying at its upper end a transverse rod 31, whose ends are reduced and engage eyes 32, rigidly secured to the back of the disk-case. Setscrews 33 may be provided to lock the disk-case at any desired angle after adjustment. The vertical rod is shown as engaging a tube 34, rigidly secured to and extending upward from a base 35, a set-screw 33 being provided for locking the vertical rod, and with it the disk-case, at any required height for convenience in use.

36 denotes the winding-shaft, and 37 one of the motor-wheels, which is engaged by a pinion 38 on a shaft 39, one end of which extends outward from the motor-case and carries a fan, which I have indicated as a whole by 40. An important feature of this fan is that it comprises radial arms 41—two in the present instance—each of which carries a blade or wing 42. These blades are provided with sleeves 43, which fit the arms closely—that is to say, with a tight enough fit to retain the blades in any position in which they are placed by friction only—the blades, however, being rotatable on the arms and longitudinally movable thereon at the control of the operator. In practice the fan acts as a governor and controls the speed of the motor. The farther inward toward the shaft the blades are moved and the nearer they are turned to a plane perpendicular to the plane of the horizon the faster the motor will run, and consequently the faster the lesson-disk will rotate. By turning the blades obliquely greater resistance will be obtained, which would of course reach its maximum when the blades are parallel to the plane of the horizon and moved well out on the arms. By turning the blades more or less obliquely and moving them in or out, as may be required, on the arms any desired rate of speed to suit the pupil may be obtained, which may be accelerated as rapidly as may be required to keep pace with and to develop the speed of the pupil.

As a convenient means of stopping and starting the motor I provide a slide 44, which is carried by a holder 45, rigidly secured to the back of the disk-case. The slide is provided with a slot 46, through which a set-screw 47 passes, by which the slide may be locked either in or out of engagement with motor-wheel 37. In practice the set-screw may be so adjusted that the slide will be retained by friction in any position in which it may be placed. The motor being wound, to start the lesson-disk the operator simply moves the slide outward far enough to disengage it from the motor-wheel, the power of the spring being great enough to start the motor the instant this wheel is released. To stop the motor at any instant, the operator simply pushes in the slide, causing it to engage wheel 37 again. This feature is quite important in use, as by stopping and starting the mechanism quickly the operator can readily determine his speed—i. e., ascertain just how much work he can accomplish in a given period of time.

The general operation will be readily understood from the drawings and the description already given; but in order that the application of the instrument to the special branch of teaching for which I have devised it may be clearly understood I will briefly describe that special use.

There are now in use two systems of teaching the art of type-writing. One system is commonly known as the "sight" system, the other as the "touch" system. In sightwork the operator must constantly glance from copy to keyboard, he must read the copy, and must also find each letter on the keyboard in order to spell out the words. By the touch system the pupil is taught to know the keyboard intuitively, as it were—that is to say, he does not look at the keyboard, but only at the copy, and when the eyes have caused a mental note to be made of the letters to be used in spelling a word the fingers simultaneously therewith are told to find the corresponding keys upon the keyboard, but without the use of eyesight in finding them. Touch type-writing is practically a new art and is being pushed by the advanced schools. It is harder to learn, but when once acquired makes work upon a writing-machine much easier for the operator and enables the operator with less effort, both mental and physical, to develop greater speed. My novel instrument assists in the teaching of touch type-writing by causing letters to come into view successively and at any desired rate of speed. In use the instrument is started by disengaging slide 44 from motor-wheel 37, and the pupil, having of course made a preliminary study of the keyboard, touches the key thereon corresponding to the upper letter, then the key corresponding to the second letter, and the third, and so on, as each letter comes successively into view. At the end of the lesson every letter upon the card will have been printed by the machine in the order in which they succeed each other spirally from the center of the disk to the edge thereof, the first letter of the lesson appearing at the top of slot 28 and the last letter of the lesson at the bottom of said slot. The pupil at first necessarily adjusts the motor to run very slowly and increases the speed only as he finds that he is able to find the characters with perfect accuracy upon the keyboard by the sense of touch only.

The instrument is so inexpensive to make as to place it within the reach of every one, enabling schools to have as many as may be required, one for every writing-machine, if desirable.

Having thus described my invention, I claim—

1. The herein-described instrument for teaching touch type-writing, the same consisting essentially of a lesson-disk having letters arranged spirally thereon, a case therefor having a slot at which the letters appear successively, means for rotating the lesson-disk and means for conveniently regulating its speed.

2. An instrument for teaching touch type-writing consisting of a lesson-disk having letters arranged thereon spirally, a case therefor having a slot at which the letters appear successively, means for adjusting the case at any desired height and angle of inclination and means for rotating the lesson-disk within the case.

3. An instrument for teaching touch typewriting consisting of a lesson-disk having letters arranged thereon spirally, a case therefor having a slot at which the letters appear successively, a motor for rotating the lesson-disk, means for stopping and starting the motor and means for regulating its speed.

4. An instrument for teaching touch typewriting consisting of a lesson-disk having letters arranged spirally thereon, a motor having a carrying-disk with pins to hold the lesson-disk, a case adapted to inclose the carrying-disk and the lesson-disk and having a slot at which the letters appear successively and means for controlling the speed of the motor.

5. An instrument for teaching touch typewriting consisting of a lesson-disk having letters arranged spirally thereon, a motor having a carrying-disk for lesson-disks, a case adapted to carry the motor and to inclose the carrying-disk and the lesson-disk and having a slot at which the letters appear successively and means for adjusting the case vertically and at any desired angle of inclination.

6. An instrument for teaching touch typewriting consisting of a lesson-disk having letters arranged thereon spirally, a motor having a carrying-disk for lesson-disks, a case adapted to carry the motor and to inclose the carrying-disk and the lesson-disk, said case being closed by a door having a slot at which the letters appear successively and means for regulating the speed of the motor.

7. An instrument for teaching touch typewriting consisting of a lesson-disk having letters arranged thereon spirally, a motor having a carrying-disk for lesson-disks, a case which carries the motor and incloses the carrying-disk and the lesson-disk and is provided with a slot at which the letters appear successively, and a rotary fan having a pinion meshing with one of the motor-wheels and adjustable blades whereby the speed at which the letters appear at the slot may be regulated.

8. An instrument for teaching touch typewriting consisting of a lesson-disk having letters arranged spirally thereon, a motor having a carrying-disk for lesson-disks and a wheel 37, a case carrying the motor and inclosing the carrying-disk and the lesson-disk and provided with a slot at which the letters appear successively, and a rotary fan having a pinion meshing with wheel 37, said fan comprising radial arms and blades having sleeves which engage the arms and may be adjusted obliquely and radially thereon to regulate the speed of the motor.

9. An instrument for teaching touch typewriting consisting of a lesson-disk having letters arranged spirally thereon, a motor having a carrying-disk for lesson-disks and a wheel 37, a case carrying the motor and inclosing the carrying-disk and the lesson-disk and having a door with a slot through which the letters appear successively, a rotary fan having a pinion-engaging wheel 37 and a slide adapted to be moved into and out of engagement with said wheel to stop and start the motor.

In testimony whereof I affix my signature in presence of two witnesses.

IRA S. BROWN.

Witnesses:
A. M. WOOSTER,
S. W. ATHERTON.